(12) United States Patent
Adams

(10) Patent No.: US 9,548,681 B2
(45) Date of Patent: Jan. 17, 2017

(54) VORTEX FLUX GENERATOR

(71) Applicant: Richard Adams, Grass Valley, CA (US)

(72) Inventor: Richard Adams, Grass Valley, CA (US)

(73) Assignee: Silicon Turbine Systems, Inc., Cupertino, CA (US)

( * ) Notice: Subject to any disclaimer, the term of this patent is extended or adjusted under 35 U.S.C. 154(b) by 514 days.

(21) Appl. No.: 14/181,834

(22) Filed: Feb. 17, 2014

(65) Prior Publication Data

US 2014/0265643 A1    Sep. 18, 2014

Related U.S. Application Data

(63) Continuation of application No. 13/121,472, filed as application No. PCT/IB2009/054268 on Sep. 30, 2009, now Pat. No. 8,692,437.

(60) Provisional application No. 61/194,881, filed on Sep. 30, 2008.

(51) Int. Cl.
*H02N 11/00* (2006.01)

(52) U.S. Cl.
CPC .................. *H02N 11/002* (2013.01)

(58) Field of Classification Search
CPC ......... F25B 21/00; Y02B 30/66; H02N 11/002

USPC ........................................................ 310/306
See application file for complete search history.

(56) References Cited

U.S. PATENT DOCUMENTS

| | | | | |
|---|---|---|---|---|
| 3,421,330 A | * | 1/1969 | Otter, Jr. ................ | F25B 21/00 62/3.1 |
| 3,478,230 A | * | 11/1969 | Otter, Jr. ................ | H01L 37/00 310/306 |
| 5,563,368 A | * | 10/1996 | Yamaguchi ............ | H01L 37/00 136/200 |
| 2006/0110260 A1 | * | 5/2006 | Hsu ........................ | H02K 44/08 417/48 |

* cited by examiner

*Primary Examiner* — Thanh Lam
(74) *Attorney, Agent, or Firm* — Toering Patents PLLC

(57) ABSTRACT

A method and apparatus for generating electricity by electromagnetic induction, using a magnetic field modulated by the formation, dissipation, and movement of vortices produced by a vortex material such as a type II superconductor. Magnetic field modulation occurs at the microscopic level, facilitating the production of high frequency electric power. Generator inductors are manufactured using microelectronic fabrication, in at least one dimension corresponding to the spacing of vortices. The vortex material fabrication method establishes the alignment of vortices and generator coils, permitting the electromagnetic induction of energy from many vortices into many coils simultaneously as a cumulative output of electricity. A thermoelectric cycle is used to convert heat energy into electricity.

20 Claims, 5 Drawing Sheets

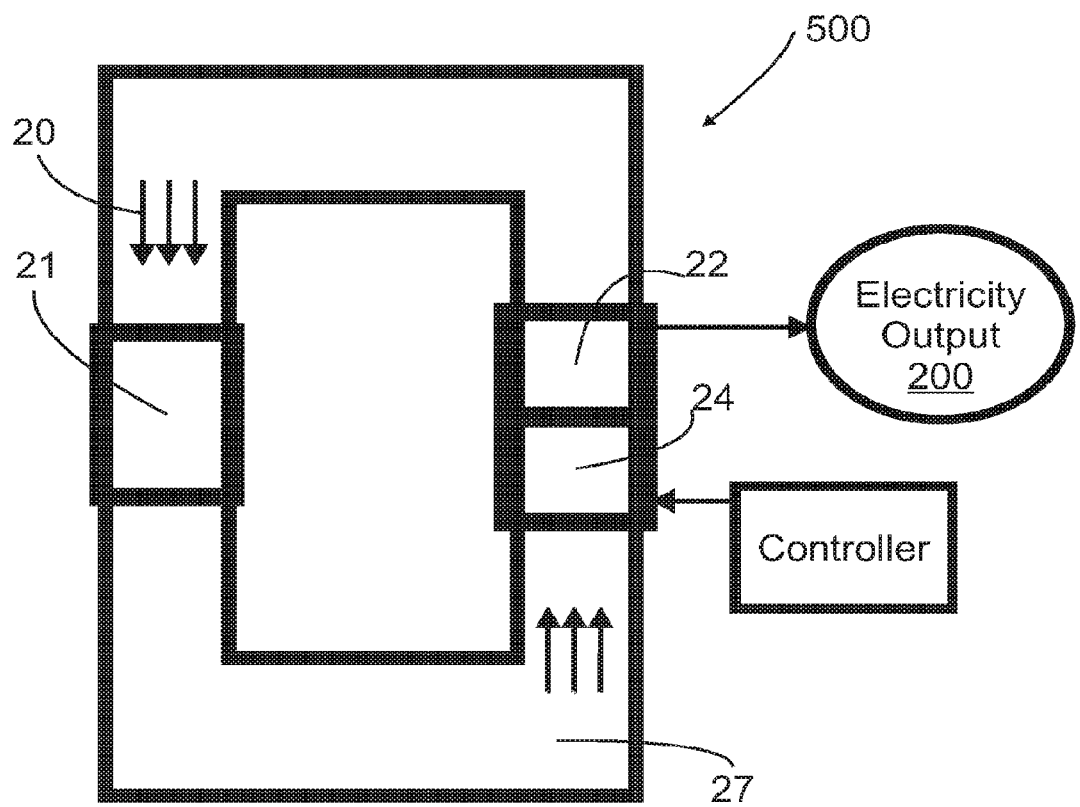
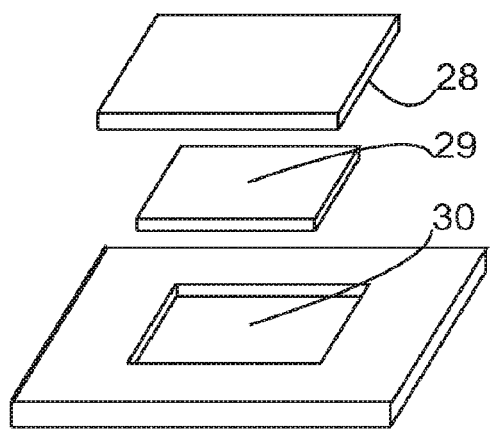
FIG. 2A
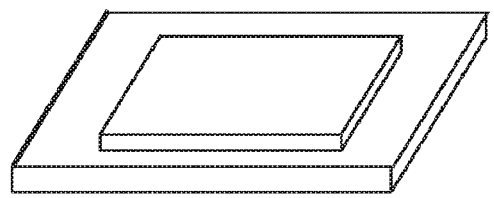
FIG. 2B

VORTEX FLUX GENERATOR

CROSS-REFERENCE TO RELATED APPLICATIONS

The present application is a continuation of application Ser. No. 13/121,472, which was filed on Jun. 9, 2011, entitled "Vortex Flux Generator," now U.S. Pat. No. 8,692, 437; which in turn is a 371 National Phase application of International Application No. PCT/IB2009/054268, which was filed on Sep. 30, 2009, entitled "Vortex Flux Generator;" which in turn claims priority to U.S. Provisional Patent Application No. 61/194,881, filed on Sep. 30, 2008. The contents of each of these applications are incorporated herein by reference in their entirety.

BACKGROUND OF THE INVENTION

1. Field of the Invention

The present invention relates to a method and apparatus for energy conversion. More specifically, the invention relates to a method and apparatus for cyclical conversion of an input energy source into the kinetic energy of a magnetic field modulated by vortices, and then into electric energy.

2. Related Art

The following definitions are used herein:

Electrical conductor: Comprised of an assemblage of matter that forms a volume of material with the property of conducting electric current with low loss or no loss.

Diamagnetism: A property of matter where magnetic fields permeate with a reduced degree of penetration, or are repelled, defined here to clarify the definition of vortices used herein.

Vortex (when used, the plural "vortices" is also implied): Comprised of matter forming a area, located within and/or adjacent to a vortex material, that has the characteristic of reduced diamagnetism within said area, relative to a comparatively increased diamagnetism outside said area. The said area may be comprised of an additional dimension establishing a volume. The reduced diamagnetism allows a higher magnetic field density within a vortex, while the area surrounding the vortex has a relatively lower density of the magnetic field.

Vortices are formed by a set of conditions applied to a vortex material. For example, by placing a vortex material, that may be comprised of a superconductor material, in a magnetic field, and transferring heat energy out of the material, urging the material into the superconducting state, vortices form within and/or adjacent to the material. When a vortex forms, the magnetic field density inside the vortex increases, and since the field may be comprised of a total field in an area in which that field is conserved, the magnetic field surrounding the vortex is urged to decrease, such that the total conserved field, comprising the field inside and outside the vortex, remains the same.

Vortex material: Comprised of an assemblage of matter within and/or adjacent to which a vortex can form. The vortex that forms may do so because of conditions comprised by the properties of the said vortex material. An example vortex material is a superconductor material. The vortex material may be comprised of an assemblage of various materials that include both superconducting and non-superconducting materials, such that assemblage will produce a vortex. In additional to a material that forms vortices, the other matter assembled may be comprised of materials that include mechanical support, energy flow connections, insulation, and materials that urge an artificial means to predispose the location that a vortex will form.

The vortex material may be re-entrant, meaning that the vortex forms and subsequently dissipates in the vortex material, without any external stimulation. The vortex material may be non-re-entrant, meaning that that a vortex forms and/or dissipates only upon external stimulation. The vortex material may be comprised of materials that exhibit both re-entrant and non-reentrant behavior. The vortex material may be comprised of materials that can be stimulated to form and dissipate vortices by a controlling means that transfers energy into and out of the vortex material.

The vortices that form may be comprised of predisposed dimensions that are determined by the properties of the assemblage of matter that forms the vortex material, and determined by the environmental conditions that the vortex material is operated in. By artificially compelling a plurality of vortices to form at predetermined locations, other vortices nearby will also form at predictable locations nearby the vortices specifically compelled, by virtue of predisposed dimensions of the vortices.

Magnetic field modulation: A change in the density of a magnetic field permeating an area of matter, whereby the change occurs over an interval of time. For example, the formation and dissipation of a vortex will change the magnetic field near where the vortex forms and dissipates. This changing magnetic field over time is a kinetic energy, comprised of a movement of the density of the field, also known as a modulation of the magnetic field, since the field density is moving as time elapses. This may be referred to as field modulation, field density change, movement of magnetic flux, or modulation of the field. All have the same meaning.

Inductor: An electrical conductor formed such that magnetic field modulation nearby the electrical conductor induces an electric current to flow in the electrical conductor.

SUMMARY OF THE INVENTION

It is accordingly a primary objective of the present invention to provide a method and apparatus for the generation of electric power by using electromagnetic induction of the modulation of a magnetic field, and energy conversion provided by vortices in a vortex material.

This energy conversion objective is achieved by the present invention that utilizes the known properties of vortex materials that modulate magnetic flux in a magnetic circuit, combined with the known laws of electromagnetic induction, whereby the modulated magnetic flux produces an electromotive force in electrical conductors, that can be used to supply electrical energy to devices that require an input of electrical energy.

The vortex flux generator employs the magnetic field from a magnetic circuit, a vortex material that is known to produce vortices that modulate the magnetic field, and a plurality of interconnected inductors disposed near the location of the vortices, such that the flux modulation of the vortices is converted into electricity, and accumulated into electrical conductors.

A controller means is used provide the conditions needed to urge the vortex material to form vortices, and thereby modulate the magnetic field. The controller's function may be summarized that it is comprised of a means or collection of means to transfer energy into and out of the vortex material.

The vortices, that are facilitated to occur by the known properties of the vortex material, occur at a microscopic level of existence. In order to accumulate a non-zero electric power from the microscopic movement of magnetic flux urged by the vortices, the inductors are manufactured to match the microscopic modulation. Microelectronic manufacturing methods are used fabricate the inductors that are comprised of the correct dimensions, position, and to interconnect them. The electrical power produced is comprised of an accumulation of the converted energy of a plurality of vortices that is induced into a plurality of inductors.

The inductors are manufactured with their position and size known, as according to the design parameters of the manufacturing process. The vortex material produces vortices by virtue of the properties of the vortex material. By fabricating a vortex material, the vortices may occur.

To facilitate a correspondence to the location of magnetic flux modulations, the vortices are artificially aligned to the inductors, by urging the vortices to form at locations corresponding to the known location of the inductors.

The controller transfers energy that may be comprised of energy from a variety of sources into the apparatus, and removes excess energy that is not converted into electricity. In this energy transfer process, vortices are formed and dissipated, causing electricity to be generated in the inductors.

The present invention can be practiced minimally by using a single vortex. The present invention can be scaled to any size by increasing the quantity of vortices and the quantity of inductors, to comprise a generator suitable to power a broad range of electric power applications. The energy input may be comprised of energy from a broad range of energy sources.

Other features, advantages and objects of the present invention will be apparent to those skilled in the art upon a reading of the specification including the accompanying drawings.

BRIEF DESCRIPTION OF THE DRAWINGS

The invention is better understood by reading the following Detailed Description of the Preferred Embodiments, with reference to the accompanying drawing figures, in which:

FIG. 1 is a schematic illustration of a vortex flux generator in accordance with the present invention.

FIG. 2A is an expanded perspective illustration of a method to mount the vortex material chip and the inductor chip sandwiched together with a mounting substrate.

FIG. 2B is a perspective illustration of a method to mount the vortex material chip and the inductor chip sandwiched together with a mounting substrate from FIG. 2A, where the sandwiched chips are mounted to the mounting substrate, and one of the sandwiched chips is concealed inside the recess of the mounting substrate.

DETAILED DESCRIPTION OF THE PREFERRED EMBODIMENTS

Figure 3:
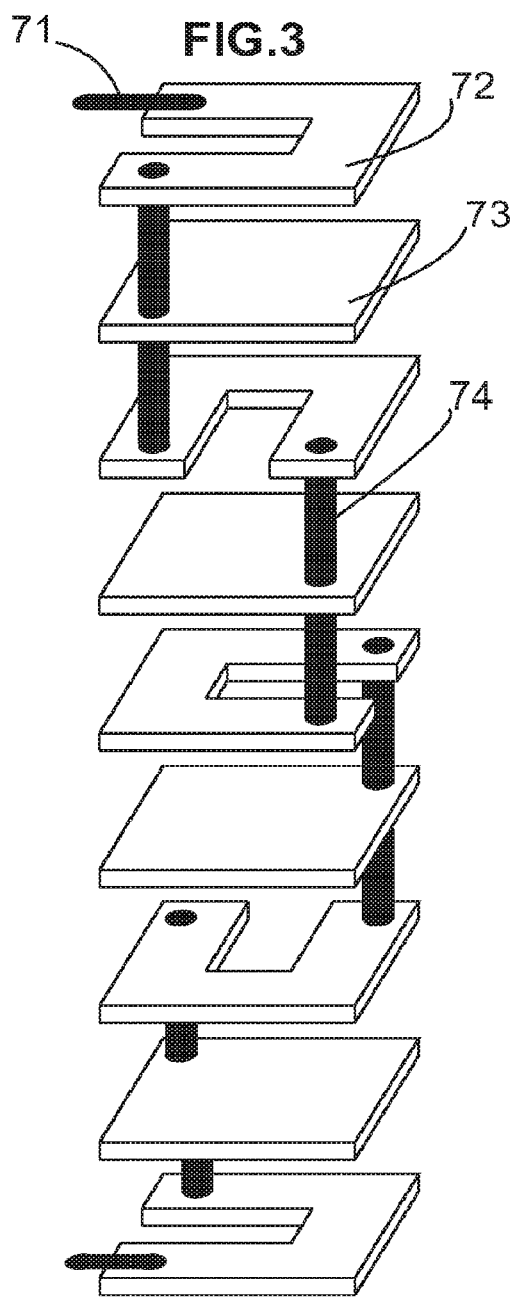
FIG. 3 is an enlarged expanded perspective schematic illustration of the layered components that an inductor in the vortex flux generator may be comprise of FIG. 3A is an enlarged expanded perspective schematic illustration of the layered components that an inductor in the vortex flux generator may be comprised of, where the layered components of FIG. 3 are illustrated in a manner that is more representative of how these layered components are actually assembled together. Compared to FIG. 3, the components in FIG. 3A are illustrated with a lesser degree of vertical expansion, and more components are hidden by adjacent components

In describing preferred embodiments of the present invention illustrated in the drawings, specific terminology is employed for the sake of clarity. However, the invention is not intended to be limited to specific terminology so selected, and it is to be understood that each specific element includes all technical equivalents that operate in a similar manner to accomplish a similar purpose. The scale of the components used in the illustrations is comprised of a scale suitable for illustrative purposes. The actual dimensions of the components fabricated in a preferred embodiment may be comprised of a different scale.

The present invention is a vortex flux generator 500 (shown in FIG. 1) that combines the known property of vortex materials, including magnetic flux modulation, to urge an electric current to flow in an inductor using the known property of electromagnetic induction.

Referring to FIG. 1, a magnetic circuit is formed using a magnetic core 27, comprised of magnetic powder or amorphous metal with a 0.7 Tesla magnet or magnets 21, comprised of a permanent magnet or electromagnet inserted in the circuit, yielding a magnetic field denoted by the illustrative field lines 20. A vortex material 24, and inductor array 22, are placed within the magnetic circuit. Thereby, the vortex material and inductor array are adjacent to each other in the magnetic field. The elements of the component labeled "Controller" in FIG. 1 are detailed in FIG. 11. The Electricity Output 200 represents the power output of the present invention.

Referring to FIG. 3, a microscopic inductor is fabricated using microelectronic fabrication. This fabrication process is comprised of a layered microelectronic process analogous to the process currently used to fabricate CMOS integrated circuit chips. The exemplary expanded inductor shown in FIG. 3 is comprised of five layers of copper alloy electrical conductors 72, where the trace width and spacing is fifty five nanometers. Both the trace height of eighty two nanometers, and insulator 73 thickness of ten nanometers, are not proportionally scaled to the thickness of the electrically conductive layer in the illustration. An electrically conductive via 74, through the insulator 73, interconnects the layers of the inductor.

An electrical interconnect 71 may be comprised of a continuation of the trace of the electrical conductor 72. This interconnect 71 may be used to connect to other inductor assemblies. An analogous interconnect, at the bottom most conductor layer shown, provides the connection for the opposite end of the inductor assembly in FIG. 3.

Figure 4:
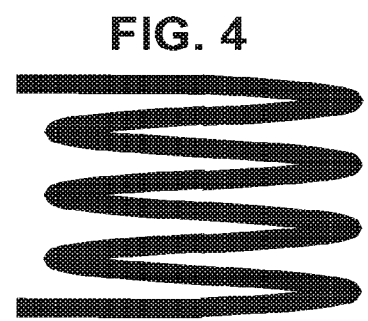
FIG. 4 is an enlarged illustration of a helical coil of electrically conductive matter that is analogous to and may be utilized as the inductor in the vortex flux generator.

In the exemplary embodiment, each layer of the electrically conductive material is an arced segment that is not closed upon itself. Each layer comprises three-fourths of a turn of an equivalent helical coil. Alternately, a helical coil fabricated from a fifty nanometer diameter wire, depicted in FIG. 4, may be utilized as the inductor in the present invention.

Figure 3A:
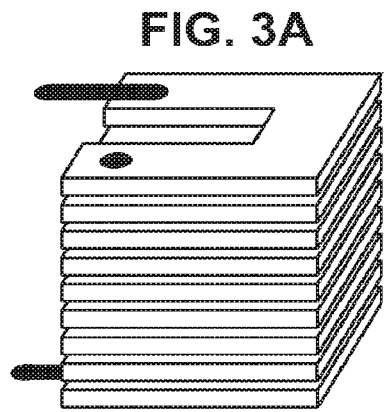

In FIG. 3A, the expansion of the view in FIG. 3 is decreased, forming a more uniform illustration. This inductor assembly of FIG. 3A is comprised of the same components as FIG. 3.

Figure 8:
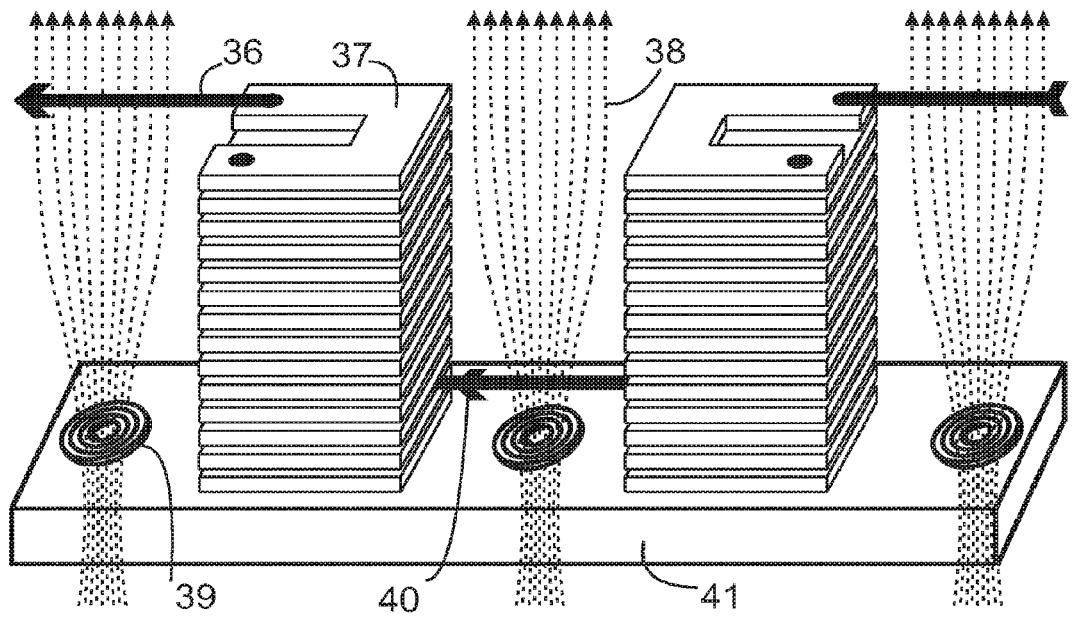
FIG. 8 is an enlarged expanded perspective schematic illustration that depicts the magnetic flux being modulated by a plurality of vortices, and a plurality of layered inductors analogous to the inductor of FIG. 3A, that are interconnected in series, producing electricity.
Figure 10:
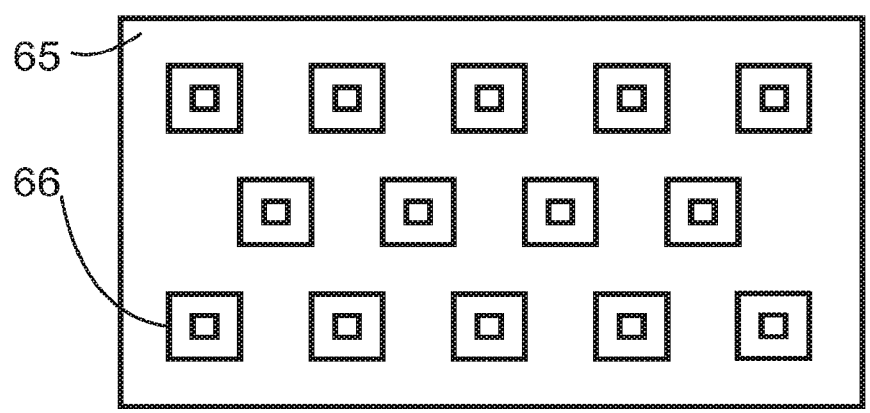
FIG. 10 is an enlarged expanded illustration looking upon the plane of an array of inductors that are manufactured analogous to the inductor of FIG. 3A, in positions that correspond to the urged location of the vortices depicted in FIG. 9B.

In FIG. 8, the inductor assembly 37 is comprised of seven layers of an electrical conductor, and seven layers of insulator, comprising five and one quarter turns of the conductor that comprises the inductor, about its central axis. The inductor 37 is an extension of the assembly in FIG. 3A, with more layers, such that the electrical interconnects 36 and 40 for the assembly exit on opposite sides, facilitating interconnection to the adjacent inductor assembly also shown in FIG. 8, and interconnected with trace extension 40. In FIG. 10, fourteen of these layered inductor assemblies 66 are depicted in an array upon a substrate 65. The substrate 65 is comprised of a one millimeter silicon wafer.

Figure 6:
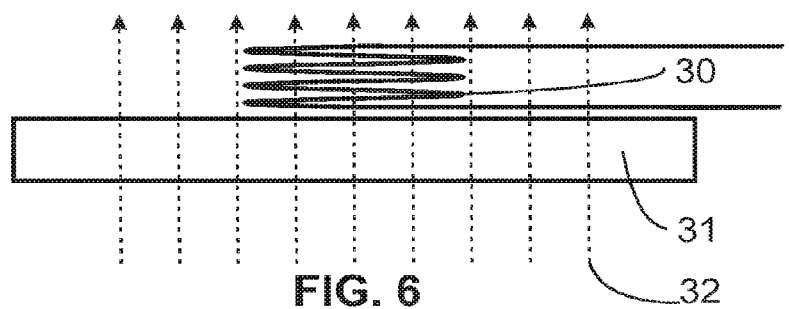
FIG. 6 is an enlarged schematic illustration of a single inductor disposed near a vortex material, wherein a depicted magnetic field density is not modulated by a vortex.

Referring to FIG. 6, a single inductor 30 is illustrated. Magnetic flux lines 32 are shown in the state where no vortex is present from the vortex material 31, and there is negligible current flowing in the inductor 30.

Figure 7:
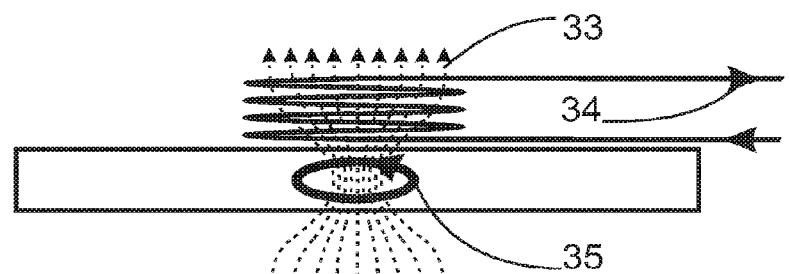
FIG. 7 is the enlarged schematic illustration identified as FIG. 6, with a vortex now present. The vortex is modulating the magnetic flux, and inducing electricity in the inductor.

FIG. 7 illustrates the same components as FIG. 6, wherein a vortex 35 has formed, and the magnetic field indicated is increasing in density in the vortex 35, and in the adjacent single inductor. The increasing magnetic field density is illustrated by 33. While the magnetic field density is increasing in the inductor, electric power flows from the inductor, indicated by the arrow 34. Though not depicted, when the vortex dissipates, electric power also flows from the inductor, with the current in the opposite direction, according to Lenz's Law.

FIG. 8 illustrates a placement of inductor assemblies 37 in between the location that vortices 39 form from a vortex material 41. Three vortices are shown. By this placement of the inductors, the magnetic flux density decreases in the inductors when the vortices form. This decrease in flux density induces electric power to flow from each of the inductor assemblies. The interconnect 40 connects the two illustrated inductor assemblies shown in series. This connection accumulates the electric power from the inductors. The interconnect 36 may comprise a connection to another inductor, or a connection to a load powered by the Electricity Output 200 of the present invention, shown in FIG. 1 and FIG. 11.

Each of the inductor assemblies has connector terminals comprised of at least two terminals. The interconnecting conductors between them establish an interconnecting means. Every interconnection results in a fewer number of conductors emanating from the plurality of interconnected inductors so connected. In the exemplary embodiment, millions of inductors are connected in series, resulting in an accumulation of the electrical power from millions of inductors into a single pair of conductors, thereby providing a fewer number of conductors, by using microelectronic fabrication of an interconnecting means of a plurality of interconnected inductors. A million inductors have at least two million connection terminals. When interconnected, the million inductors have a result that may be comprised of two terminals instead of two million.

Again referring to FIG. 8, during the formation and dissipation of the vortices, the magnetic flux 38 may be comprised of an induced electric power in the inductor by the action of the vortex while the vortex is stationary with respect to the inductor and vortex material 41. This is by the increased density of magnetic flux within the vortex as compared to the density of the flux surrounding the vortex.

The electric power induced in the inductor may be induced by an electromagnetic induction comprised of a changing magnetic field with respect to the inductor by a movement of a vortex respectively to the inductor, where the vortex 39 that carries an increased magnetic field density within it moves with respect to the inductor 37. Although a means is deployed to have the vortices form at predetermined positions, vortices may move respectively to the vortex material and inductors by the action of energy in the vortex material. Said energy may be comprised of the energy of the electrical current produced by the Quench Control 600 in FIG. 11.

The electric power induced in the inductor may be induced by an electromagnetic induction comprised of a changing magnetic field with respect to the inductor by a displacement of magnetic flux density from one vortex to another. This occurs by the property of the vortices, where an amount of flux in one vortex may displace to other vortices. Although the total of the flux density in all vortices is conserved, the flux passing through an inductor disposed nearby will change, producing electricity in the inductors that encompass the changing flux.

Figure 9A:
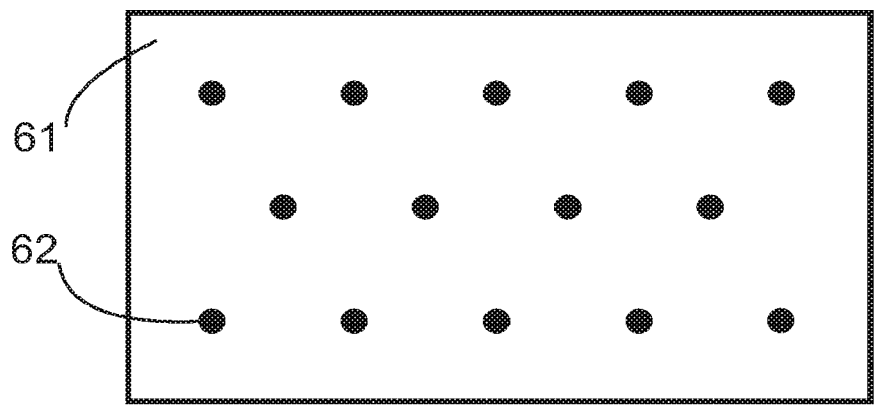
FIG. 9A is an enlarged expanded illustrated view of a surface plane of the vortex material, depicting the location where a means has been deployed to urge the formation of vortices at particular positions.

FIG. 9A depicts a surface plane of the vortex material. In an exemplary embodiment, the vortex material 61 is comprised layers of materials deposited on a substrate, that may either begin with the same substrate as the substrate for the inductor array, or utilize its own substrate. If on its own substrate, the substrate used may be comprised of a material that has a cryogenic contraction rate analogous to the rate of contraction of the inductor substrate, such that the alignment between the vortices and inductors is maintained across the range of operating temperatures.

When a separate substrate is used, the substrate for the vortex material chip and the substrate for the inductor array chip may both be comprised of a one millimeter silicon wafer.

When fabricating the layers of the vortex material chip, buffer and insulator layers are used, and a Bismuth based Type II superconductor thin film fifty nanometers thin deep, commonly known as Bi-2223 is deposited, resulting in a smooth surface that will mate with the inductor chip's smoothed surface.

FIG. 9A also depicts the locations where a means to urge vortices to form at predetermined positions is deployed. Fourteen such locations are identified 62. At locations 62, the material may have a change in static magnetic permeability, such as by the deposition of a material at these locations with a different magnetic permeability than the surrounding material, providing a means to urge a gradient in the magnetic field density resulting in a different magnetic field density, and in particular a static gradient change in the magnetic field at 62, whereby a vortex forms there.

Another means to urge vortices to form at predetermined positions may be comprised of the actuation of an inductor adjacent to the vortex material, by an electrical current in the inductor, using the inductor as a solenoid electromagnet, thus comprising a means for a dynamic gradient change in the magnetic field, whereby the vortex will form at the location 62, as urged by of the solenoid's magnetic field.

Another means to urge vortices to form at predetermined positions may be comprised of a means for a change in the uniformity of the vortex material at predetermined positions. This may be comprised of a change in molecular composition in the material, such as by the deposition of molecules that are different from the molecules of vortex material, at the predetermined positions 62.

Another means to urge vortices to form at predetermined positions may be comprised of a change in the crystal lattice structure, comprised of a defect or non-uniformity of the lattice at predetermined positions, comprised of a similar molecular formula as the whole, though with different atoms specifically at the predetermined positions 62 in the lattice.

Another means to urge vortices to form at predetermined positions may be comprised of a change in dimension of the vortex material at predetermined positions, such as a change in the thickness of the layers of substrate, buffer or vortex generating molecular regime, such as is used in the exemplary embodiment described below.

In the exemplary embodiment, an etching process is used to change the dimension of the Bi-2223 thin film at locations 62, to establish the locations where vortices will form. This change in dimension is effected by an etching process that is comprised of reducing the depth of the Bi-2223 material by twenty five nanometers in a half spherical etching cavity that is twenty five nanometers in diameter, at each location 62.

Figure 9B:
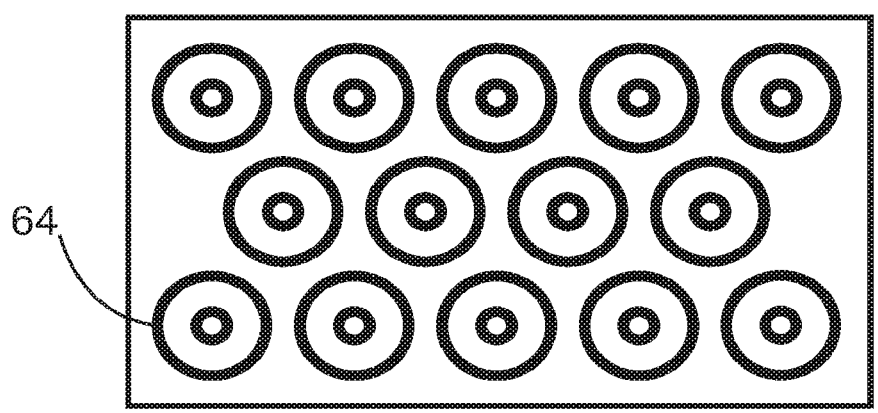
FIG. 9B is an enlarged expanded illustrated view of a surface plane of the vortex material of FIG. 9A, depicting vortices that have formed at the urged positions.

FIG. 9B illustrates the same vortex material as FIG. 9A, where the vortices 64 have formed.

FIG. 10 is an illustration of the corresponding locations of the inductor assemblies that are comprised of a layered construction method detailed in FIG. 3 and FIG. 3A, that are grouped into a matrix, and interconnected to accumulate the electric power induced into them by the modulated flux from the vortices of FIG. 9B.

In the exemplary embodiment, the inductor array substrate 65 of FIG. 10 is assembled adjacent to the vortex material substrate 61 of FIG. 9A, by layering the two substrates upon each other. The result is that the vortices which form at the predetermined positions within the vortex material, that is layered to the inductor array substrate, are formed at positions with correspond to the position of the inductors.

In the exemplary embodiment, the predetermined positions place the vortices three hundred and thirty nanometers apart at their centers. In order to encompass a net changing flux density in the inductors, the length of the segments in the inductors may be comprised of a length that is approximately half or less than the distance between the vortices. This establishes at least one predetermined dimension that in the exemplary embodiment is one hundred and sixty five nanometers in length, for the segments of the inductors.

The predetermined positions and dimension are illustrated by the correspondence of the location of vortices and inductors in FIG. 6, FIG. 7, FIG. 8, FIG. 9A, FIG. 9B, and FIG. 10. For illustrative purposes, the figures shown may comprise a scale that is different from the scale of the exemplary embodiment.

Referring to FIG. 2A, in the exemplary embodiment, the inductor array is comprised of one billion interconnected inductor assemblies on a chip 28, with an area of one centimeter square. In FIG. 2A, the substrate of the inductor array chip 28 is facing up. The vortex material chip 29, on its own substrate, has its substrate facing down.

These two chips 28 and 29 of FIG. 2A are mounted to each other with the substrates facing outward, and the inductors and superconductor films separated by insulation layers comprised of one hundred nanometers total thickness from all mating surfaces.

In FIG. 2B, the two sandwiched chips from FIG. 2A are installed into the substrate, such that the chip 29 of FIG. 2A, now attached to chip 28, is concealed beneath chip 28 in the illustration of FIG. 2B, inside the substrate cavity 30 of FIG. 2A.

Figure 5:
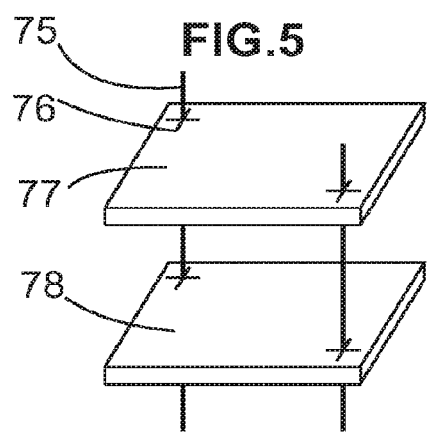
FIG. 5 is an enlarged expanded perspective schematic illustration representative of an alignment means used to align layered components in the vortex flux generator.

Referring to FIG. 5, the two layers 77 and 78 correspond to the two chips 28 and 29 of FIG. 2A, in this particular example. FIG. 5 depicts the usage of an alignment means to ensure the corresponding placement of the vortex locations and inductor locations using perpendicular references 75, and alignment marks 76 manufactured into each chip 77 and 78, wherein the alignment marks correspond to the placement of the elements of each respective chip to be aligned.

The two layers, 77 and 78, used in this generalized alignment means of the FIG. 5 illustration, may also refer to the alignment of individual layers, rather than specific chips The chips aligned and attached to each other using the aforesaid alignment method, are mounted into a substrate with a cavity 30 of FIG. 2A. The cavity provides a recess into which the chip 29 will be contained after being mounted to chip 28. The result is that the larger chip 28 appears on the top of the substrate 30, and this result is shown in FIG. 2B. This resulting aligned chip sandwich includes the vortex material 24, and inductor array 22, both of FIG. 1, inserted into the magnetic circuit 27.

The Bismuth based superconductor used as the source of the vortices in the vortex material chip operates at cryogenic temperatures, as a superconductor, in the magnetic field of the magnetic circuit. It can be quenched out of the superconducting state by an application of additional energy including nuclear energy, electromagnetic energy, thermal energy, modulation of the magnetic field or an electric current. When quenched, the vortices dissipate. These forms of energy may also comprise energy that provides the energy converted into electricity by the present invention. The energy that is the source of the converted energy, and the energy that performs the quenching, may be comprised of at least one of these, or a plurality of these.

A Bi-2223 superconductor thin film can be rapidly quenched with a modest electrical current when a static magnetic field is already present, as in the case of the present invention.

Figure 11:
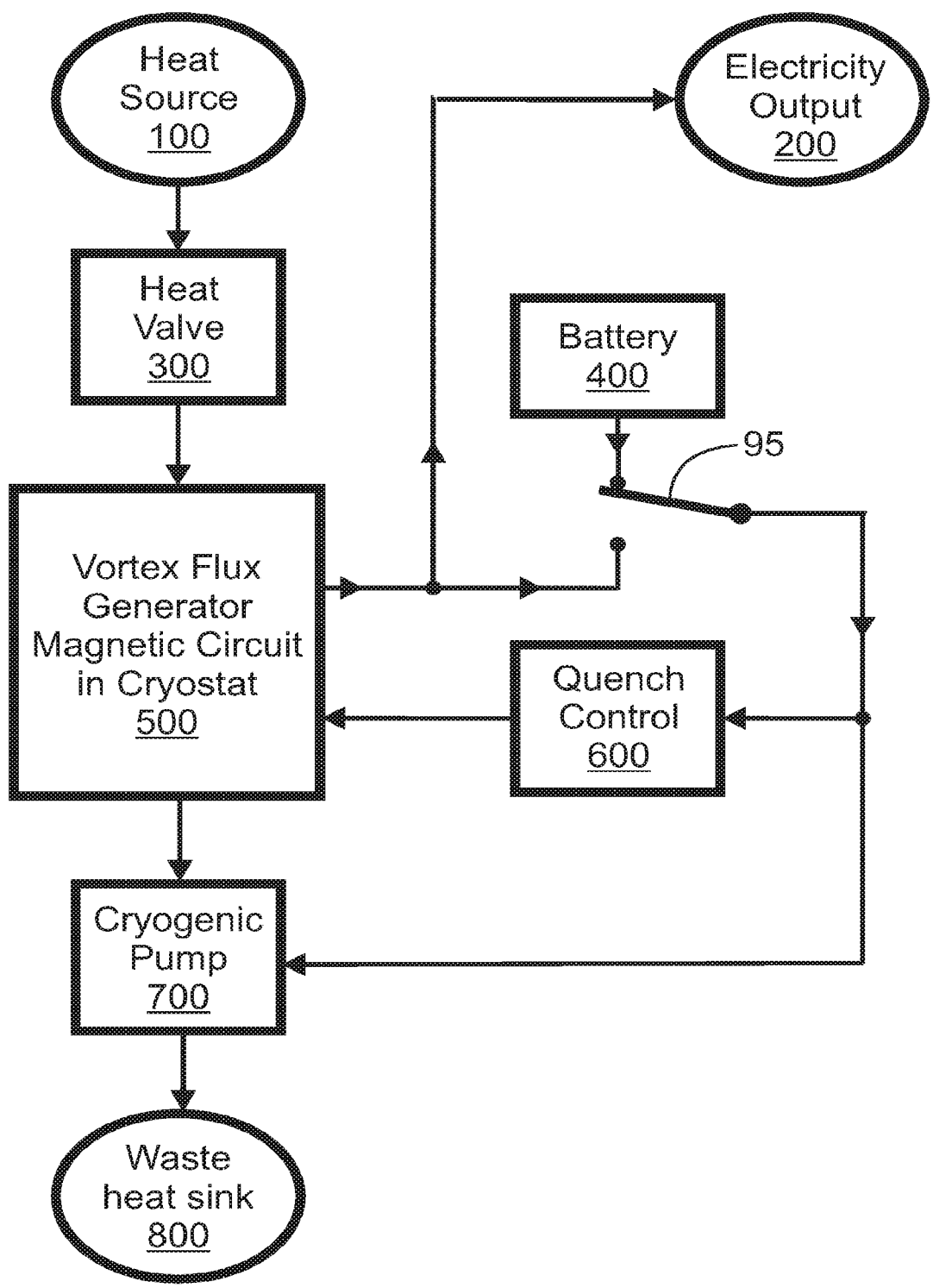
FIG. 11 is schematic illustration of the vortex flux generator depicting the elements of the control system, energy source, sink and output.

Referring to FIG. 11, in an exemplary embodiment, a quench control circuit 600 applies a pulse of electric current to the vortex material. The current used is ten times the nominal half ampere quenching current, applied as a high speed current pulse via Quench Control circuit 600, as a one hundred nanosecond, five ampere quenching pulse. This quenches the vortex material within 500, dissipating vortices. Feedback may be utilized by Quench Control 600 to modulate the quenching pulse, while utilizing minimal electric energy, such that the net Electricity Output 200 is maximized.

Although a vortex material in the present invention may be comprised of one that is a re-entrant vortex material, a non-re-entrant vortex material, and a vortex material which is controlled by a means of stimulation nearby the vortex material, in the case of the exemplary embodiment, the controller of FIG. 1, exploded into detail within FIG. 11, supplies an means of external stimulation, via the pulsed current, to operate the vortex material in a cyclical re-entrant mode.

When the vortex material quenches, heat energy is transferred to the energy of the increased disorganization of the vortex material. That is, the vortices were more organized, and when the vortices dissipated, the vortex material becomes less organized. Heat energy is used in the vortex material to effect the change in organization. Since the vortex material is not operated adiabatically, instead of its temperature simply lowering, heat energy is transferred into the vortex material, whereby the vortex material effectively absorbs heat energy from its operating environment, especially through the heat valve 300. The actual action is that the heat energy transfers from the warmer heat valve 300 to the vortex material.

Energy supplied to the present invention may be comprised of heat energy by heat source 100, as modulated by heat valve 300. The present invention requires a sufficient flow of energy to provide for the energy needed to be converted to electricity output 200, plus the energy that is output at waste heat sink output 800, plus the energy needed by self conversion to power the quench control 600 and cryogenic pump 700 when switch 95 is not in the battery 400 position.

After cessation of the quenching current pulse, and absorbing energy from the source, the Bi-2223 material, still below its superconducting temperature threshold Tc, will be in the superconducting state, and vortices are again formed, flux is modulated, and electricity generated in the inductor array chip within 500. Vortex formation, quenching, vortex dissipation, energy absorption, together with generation of electricity by electromagnetic induction from magnetic field modulation, are the cycles of the method of the present invention.

In the process to dissipate vortices by a pulsed electric current in the exemplary embodiment, and transfer heat energy into the vortex material, more than one form of energy was involved in the cycles of the method of the present invention, comprised of the energy of an electric current, and heat energy.

With the aforementioned chip construction and magnetic field strength, and operating at a cycle rate of one MHz, the usable Electricity Output for the system is ten watts, with an energy input that may be comprised of 10.1 watts. The system may be scaled upward, and the cycle rate increased to provide correspondingly higher output capacities.

The vortex flux generator in an exemplary embodiment is used as a thermoelectric converter, with an intermediate phase of magnetic field modulation. Energy from the Heat Source 100 is converted into Electricity Output 200. Heat energy, which may be comprised of waste heat, is removed via the cryogenic pump 700 to the waste heat sink 800. Waste heat sink 800 may be comprised of a sink at a lower temperature than heat source 100.

Battery 400 is enabled via switch 95 to start the process, supplying electric power to run the cryogenic pump 700, and the quench control 600. After the cyclical energy generation operation begins, and the heat energy source is used as the energy input for the system, switch 95 may select that a portion of the electrical output of the generator 500 be used to power the quench control 600 and cryogenic pump 700, rather than use the battery.

Thus, the foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, unless otherwise specified, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed:

1. A vortex flux generator comprising:
   a magnetic circuit configured to produce a magnetic field;
   a vortex material configured to form and subsequently dissipate a vortex,
      wherein upon formation of the vortex, a magnetic field density surrounding the vortex is urged to decrease, and
      wherein upon subsequent dissipation of the vortex, the urging to decrease ceases and the magnetic field density increases prior to a reformation of the vortex,
      wherein the decrease of the magnetic field density and the increase of the magnetic field density correspond to a modulation of the magnetic field; and
   an inductor disposed in a vicinity of the vortex such that the modulation of the magnetic field induces an electrical current in the inductor.

2. The vortex flux generator of claim 1, wherein the vortex material is configured to form and subsequently dissipate a plurality of vortices, wherein the inductor comprises a plurality of inductors, wherein each of the plurality of inductors is disposed in a vicinity of one of the plurality of vortices.

3. The vortex flux generator of claim 2, further comprising a plurality of interconnects configured to electrically couple the plurality of inductors and accumulate the electrical currents induced therein.

4. The vortex flux generator of claim 3, wherein each of the plurality of inductors has at least one predetermined dimension such that the electrical currents accumulated via the plurality of interconnects have a magnitude greater than zero.

5. The vortex flux generator of claim 1, wherein the vortex material comprises a superconducting material.

6. The vortex flux generator of claim 1, wherein the inductor comprises a microelectronically fabricated inductor.

7. The vortex flux generator of claim 1, further comprising a controller configured to control the formation and the dissipation of the vortex in the vortex material.

8. The vortex flux generator of claim 7, wherein the controller comprises a controller configured to control a transfer of energy into and out of the vortex material.

9. The vortex flux generator of claim 8, wherein the energy comprises at least one selected from a group comprising: thermal conduction, electrical current, electromagnetic energy, nuclear energy, and magnetic field modulation energy.

10. The vortex flux generator of claim 2, wherein the vortex material is configured to form and subsequently dissipate the plurality of vortices at respective predetermined positions within the vortex material.

11. The vortex flux generator of claim 10, wherein the vortex material is configured to form and subsequently dissipate the plurality of vortices at respective predetermined positions within the vortex material within the vicinity of a corresponding inductor.

12. The vortex flux generator of claim 10, wherein the vortex material is configured to form and subsequently dissipate the plurality of vortices at positions within the vortex material having a gradient in the magnetic field density or a change in the uniformity of the vortex material.

13. The vortex flux generator of claim 12, wherein the gradient in the magnetic field density comprises a static gradient change or a dynamic gradient change.

14. The vortex flux generator of claim 12, wherein the change in the uniformity of the vortex material comprises a change in the dimension of the vortex material, a change in a molecular composition of the vortex material, or a change in a crystal lattice structure of the vortex material.

15. A method of operation of a vortex flux generator to implement a cyclical process, the method comprising:
    causing formation and dissipation of a vortex in a vortex material, wherein the formation and subsequent dissipation of the vortex causes a modulation of a magnetic field within a vicinity of the vortex; and
    capturing the modulation of the magnetic field as a current in an electric circuit comprising an inductor disposed within the vicinity of the vortex.

16. The method of claim 15, wherein the causing formation and dissipation of a vortex in a vortex material comprises causing formation and subsequent dissipation of a plurality of vortices in the vortex material, and
    wherein capturing the modulation of the magnetic field comprises capturing the modulation of the magnetic field as a current in an electric circuit comprising a plurality of inductors, wherein each of the plurality of inductors is disposed within a vicinity of at least one of the plurality of vortices.

17. The method of claim 16, wherein causing formation and dissipation of a plurality of vortices in the vortex material comprises causing formation and dissipation of a plurality of vortices in a superconducting material.

18. The method of claim 15, wherein capturing the modulation of the electric field comprises capturing the modulation of the magnetic field as a current in an electric circuit comprising a microelectronically fabricated inductor disposed within the vicinity of the vortex.

19. The method of claim 15, causing formation and dissipation of a vortex in a vortex material comprises transferring energy into and out of the vortex material.

20. The method of claim 19, wherein transferring energy into and out of the vortex material comprises transferring thermal conduction energy, electrical current energy, electromagnetic energy, nuclear energy, or magnetic field modulation energy into and out of the vortex material.

* * * * *